United States Patent
Plamondon et al.

(10) Patent No.: US 12,006,882 B1
(45) Date of Patent: Jun. 11, 2024

(54) ROTARY ENGINE WITH DUAL-FUEL INJECTORS

(71) Applicant: PRATT & WHITNEY CANADA CORP., Longueuil (CA)

(72) Inventors: Etienne Plamondon, Candiac (CA); Jonathan Brulatout, Saint-Hubert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/331,687

(22) Filed: Jun. 8, 2023

(51) Int. Cl.
  *F02C 9/40* (2006.01)
  *F02B 53/02* (2006.01)
  *F02B 53/10* (2006.01)
  *F02B 53/00* (2006.01)

(52) U.S. Cl.
  CPC .............. *F02C 9/40* (2013.01); *F02B 53/02* (2013.01); *F02B 53/10* (2013.01); *F02B 2053/005* (2013.01); *F05D 2220/323* (2013.01)

(58) Field of Classification Search
  CPC .. F02C 9/40; F02B 53/02; F02B 53/10; F02B 2053/005; F05D 2220/323
  See application file for complete search history.

(56) References Cited

U.S. PATENT DOCUMENTS

| | | | | |
|---|---|---|---|---|
| 3,892,206 A | * | 7/1975 | Kobayashi | F02M 69/00 123/231 |
| 3,894,518 A | * | 7/1975 | Gavrun | F02B 53/00 123/299 |
| 3,960,115 A | * | 6/1976 | Lamping | F02B 53/10 123/206 |
| 3,977,367 A | * | 8/1976 | Roberts | F02M 45/086 123/275 |
| 4,323,039 A | | 4/1982 | Tsugekawa et al. | |
| 10,815,877 B2 | | 10/2020 | Julien et al. | |
| 11,111,848 B1 | | 9/2021 | Bergeron et al. | |
| 11,215,110 B2 | | 1/2022 | Thomassin et al. | |
| 2013/0186366 A1 | * | 7/2013 | Reitz | F01C 1/22 123/205 |

FOREIGN PATENT DOCUMENTS

JP     2007085203 A   *   4/2007   .........  F02D 19/0615

* cited by examiner

*Primary Examiner* — Audrey B. Walter
(74) *Attorney, Agent, or Firm* — NORTON ROSE FULBRIGHT CANADA LLP

(57) ABSTRACT

A rotary engine, has: an outer body defining a rotor cavity; a rotor within the rotor cavity and defining at least one chamber; a pilot subchamber defined by the outer body and having an outlet in communication with the rotor cavity; a main fuel source of a heavy fuel; an alternative fuel source of an alternative fuel; a main injector having a tip in communication with the rotor cavity at a location spaced apart from the outlet of the pilot subchamber, the main injector selectively fluidly connectable to the main fuel source or to the alternative fuel source; and a controller configured for: determining that the rotary engine is in a vicinity of a city or an airport; and operating the main injector in a first configuration in which the main injector fluidly connects the alternative fuel source to the rotor cavity while disconnecting the main fuel source.

20 Claims, 7 Drawing Sheets

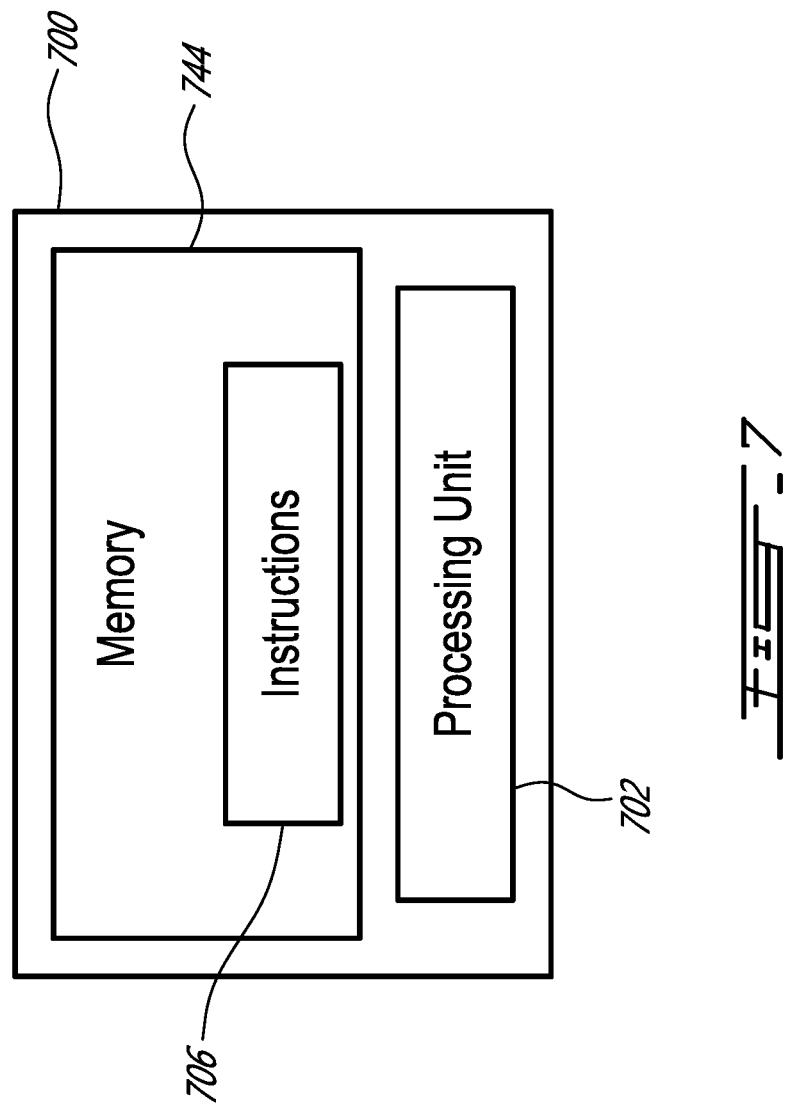

ROTARY ENGINE WITH DUAL-FUEL INJECTORS

TECHNICAL FIELD

The application relates generally to aircraft engines and, more particularly, to rotary engines and to systems and methods used to supply such engines with one or more fuel(s).

BACKGROUND

Operating rotary engines burning gasoline may present challenges under lean conditions since spark ignition typically requires a homogeneous mixture of fuel and air near stoichiometric conditions in order to have sufficient combustion stability. Typically, the fuel and air are premixed before being injected into the combustion chambers. Some rotary engines may use heavy fuel. However, these heavy fuels may be less environmentally friendly. Improvements are therefore sought.

SUMMARY

In one aspect, there is provided a rotary engine, comprising: an outer body defining a rotor cavity; a rotor rotatable within the rotor cavity and in sealing engagement with walls of the outer body and defining at least one chamber of variable volume in the rotor cavity; a pilot subchamber defined by the outer body, the pilot subchamber having an outlet in fluid flow communication with the rotor cavity; a main fuel source of a heavy fuel; an alternative fuel source of an alternative fuel different from the heavy fuel; a main injector having a tip in fluid communication with the rotor cavity at a location spaced apart from the outlet of the pilot subchamber, the main injector selectively fluidly connectable to the main fuel source or to the alternative fuel source; and a controller having a processing unit and a computer-readable medium having instructions stored thereon executable by the processing unit to cause the processing unit to: determine that the rotary engine is in a vicinity of a city or an airport; and upon determining that rotary engine is in the vicinity of the city or the airport, operate the main injector in a first configuration in which the main injector fluidly connects the alternative fuel source to the rotor cavity while disconnecting the main fuel source from the rotor cavity.

The rotary engine described above may include any of the following features, in any combinations.

In some embodiments, the instructions further cause the processing unit to: determine that the rotary engine is outside the vicinity of a city or an airport; and upon determining that rotary engine is outside the vicinity of the city or the airport, operate the main injector in a second configuration in which the main injector fluidly connects the main fuel source to the rotor cavity while disconnecting the alternative fuel source from the rotor cavity.

In some embodiments, a pilot injector has a tip in communication with the pilot subchamber, the pilot injector fluidly connectable to the main fuel source or the alternative fuel source.

In some embodiments, the instructions further cause the processing unit to: determine a temperature of the rotary engine; operate the pilot injector in a first configuration in which the pilot injector fluidly connects the main fuel source to the pilot subchamber while disconnecting the alternative fuel source from the pilot subchamber when the temperature is below a temperature threshold; and operate the pilot injector in a second configuration in which the pilot injector fluidly connects the alternative fuel source to the pilot subchamber while disconnecting the main fuel source from the pilot subchamber when the temperature is above the temperature threshold.

In some embodiments, the instructions cause the processing unit to determine that the rotary engine is in the vicinity of the city or the airport by determining one or more of an altitude of the rotary engine being below an altitude threshold, GPS coordinates of the rotary engine indicative that a distance between the rotary engine and the city or the airport is below a distance threshold, and a flight phase of the rotary engine corresponding to taxi, takeoff, climb, approach, or landing.

In some embodiments, a first energy requirement to ignite the alterative fuel is greater than a second energy requirement to ignite the main fuel.

In some embodiments, the alternative fuel has a first cetane number being less than a second cetane number of the main fuel.

In some embodiments, the alternative fuel is gasoline, hydrogen, liquefied natural gas, or ammonia, and the heavy fuel is diesel or jet fuel.

In some embodiments, a distance between the tip of the main injector and the pilot subchamber is less than a distance between two adjacent apexes of the rotor.

In some embodiments, the tip of the main injector has a first outlet in fluid communication with the rotor cavity independently of the pilot subchamber, and a second outlet in fluid communication with the rotor cavity through the pilot subchamber.

In some embodiments, the main injector is the sole fuel injector of the rotary engine, being devoid of a pilot injector.

In some embodiments, the outer body defines at least one passage having a passage inlet in fluid flow communication with the second outlet of the main injector, and a passage outlet opening to the pilot subchamber.

In another aspect, there is provided a method of supplying fuel to a rotary engine having a pilot subchamber fluidly connected to a rotor cavity defined by an outer body and a fuel injector, comprising: determining a position of the rotary engine relative to a city or an airport; injecting a heavy fuel in the rotor cavity via a fuel injector when the position of the rotary engine is outside a vicinity of the city or the airport; and injecting an alternative fuel different than the heavy fuel in the rotor cavity via the fuel injector when the position of the rotary engine is in the vicinity of the city or the airport.

The method described above may include any of the following features, in any combinations.

In some embodiments, the method includes determining a temperature of the rotary engine; and injecting the heavy fuel in the pilot subchamber via a pilot injector when the temperature is below a temperature threshold.

In some embodiments, the method includes injecting the alternative fuel in the pilot subchamber via the pilot injector when the temperature is above the temperature threshold.

In some embodiments, the determining of the position of the rotary engine includes determining one or more of an altitude of the rotary engine being below an altitude threshold, GPS coordinates of the rotary engine indicative that a distance between the rotary engine and the city or the airport is below a distance threshold, and a flight phase of the rotary engine corresponding to taxi, takeoff, climb, approach, or landing.

In some embodiments, a first energy requirement to ignite the alterative fuel is greater than a second energy requirement to ignite the main fuel.

In some embodiments, the alternative fuel has a first cetane number being less than a second cetane number of the main fuel.

In some embodiments, the alternative fuel is gasoline, hydrogen, liquefied natural gas, ammonia, and the heavy fuel is diesel.

In some embodiments, the method includes injecting the alternative fuel or the main fuel in the pilot subchamber with the fuel injector via a passage defined by the outer body, the passage opening to the pilot subchamber.

In yet another aspect, there is provided a rotary engine, comprising: an outer body defining a rotor cavity; a rotor rotatable within the rotor cavity and in sealing engagement with walls of the outer body and defining at least one chamber of variable volume in the rotor cavity; a pilot subchamber defined by the outer body, the pilot subchamber having an outlet in fluid flow communication with the rotor cavity; a main fuel source of a heavy fuel; an alternative fuel source of an alternative fuel different from the heavy fuel; a main injector having a tip in fluid communication with the rotor cavity at a location spaced apart from the outlet of the pilot subchamber, the main injector having a first main inlet fluidly connected to the main fuel source, a second main inlet fluidly connected to the alternative fuel source, a first main outlet defined by the tip and fluidly connectable to the first main inlet, and a second main outlet defined by the tip and fluidly connected to the second main inlet, the main injector configured for injecting a selected one of the heavy fuel and the alternative fuel into the rotor cavity; and a pilot injector having a tip in fluid communication with the pilot subchamber, the pilot injector having a first pilot inlet fluidly connected to the main fuel source, a second pilot inlet fluidly connected to the alternative fuel source, a first pilot outlet defined by the tip and fluidly connectable to the first pilot inlet, and a second pilot outlet defined by the tip and fluidly connectable to the second pilot inlet, the pilot injector configured for injecting a selected one of the heavy fuel and the alternative fuel into the pilot subchamber.

BRIEF DESCRIPTION OF THE DRAWINGS

Reference is now made to the accompanying figures in which:

FIG. 7 is a schematic representation of a computing device of a controller of the rotary engines of FIGS. 1-3.

DETAILED DESCRIPTION

Figure 1:
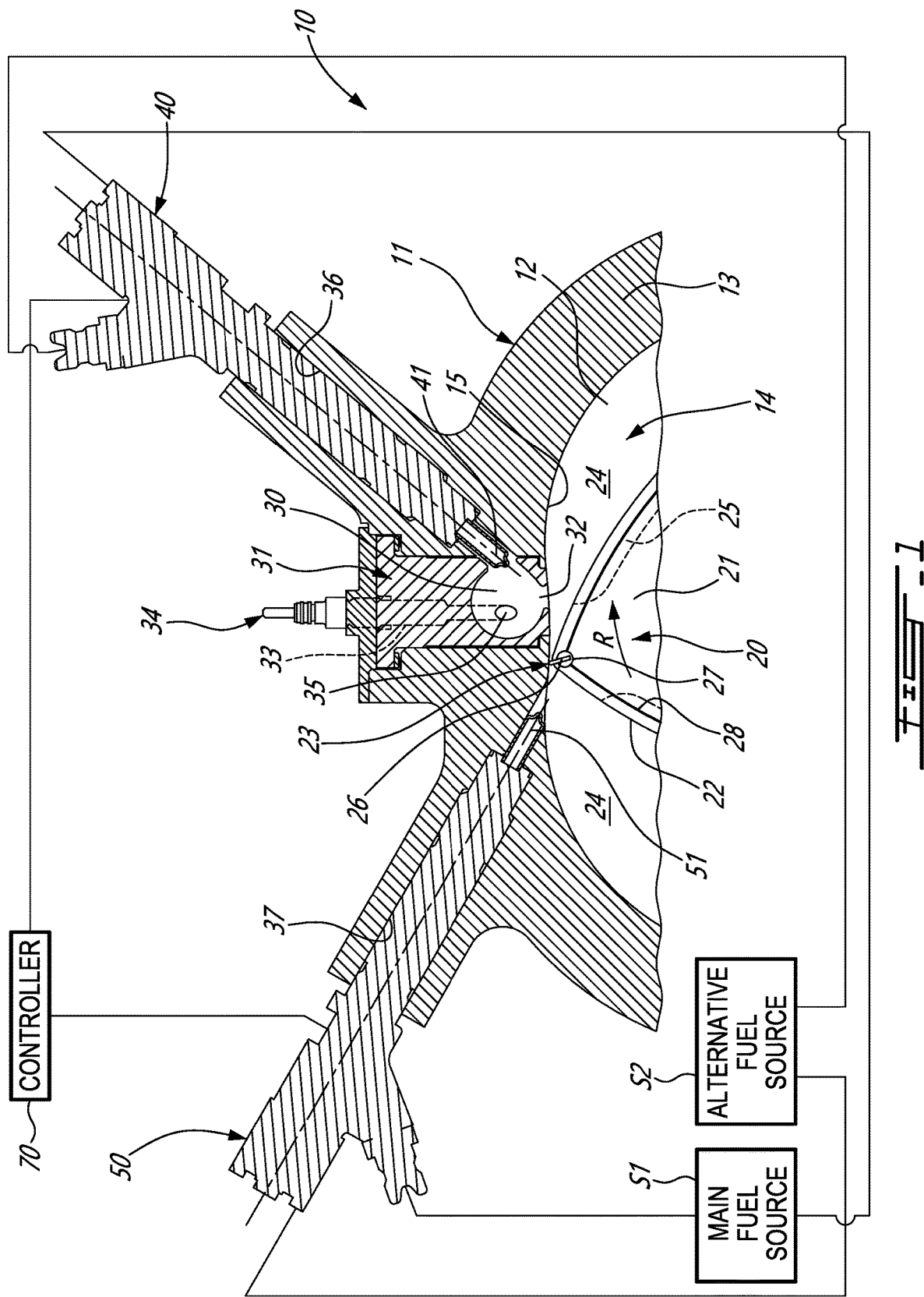
FIG. 1 is a partial cross-sectional view of a rotary engine in accordance with one embodiment.

Referring to FIG. 1, a rotary internal combustion engine, referred to below as a rotary engine, is shown at 10. The rotary engine 10 is known as a Wankel engine and comprises an outer body 11 having axially-spaced end walls, or side housings, 12 with a peripheral wall, or rotor housing, 13 extending therebetween to form an internal cavity 14. An inner surface 15 of the rotor housing 13 has a profile defining two lobes, which is preferably an epitrochoid.

An inner body or rotor 20 is received within the internal cavity 14, with the geometrical axis of the rotor 20 being offset from and parallel to the axis of the outer body 11. The rotor 20 has axially spaced end faces 21 adjacent to the side housings 12, and a peripheral face 22 extending therebetween. The peripheral face 22 defines three circumferentially-spaced apex portions 23 (only one of which is shown), and a generally triangular profile with outwardly arched sides. The apex portions 23 are in sealing engagement with the inner surface 15 of the rotor housing 13 to form three rotating working chambers 24 (only two of which are partially shown on FIG. 1) between the rotor 20 and outer body 11. A recess 25 may be defined in the peripheral face 22 of the rotor 20 between each pair of adjacent apex portions 23, to form part of the corresponding chamber 24. In some embodiments, the recess 38 may be omitted.

The working chambers 24 are sealed. Each rotor apex portion 23 has an apex seal 26 extending from one end face 21 to the other and protruding radially from the peripheral face 22. Each apex seal 26 is biased radially outwardly against the inner surface 15 of the rotor housing 13 through a respective spring. An end seal 27 engages each end of each apex seal 26, and is biased against the respective side housing 12 through a suitable spring. Each end face 21 of the rotor 20 has at least one arc-shaped face seal 28 running from each apex portion 23 to each adjacent apex portion 23, adjacent to but inwardly of the rotor periphery throughout its length. A spring urges each face seal 28 axially outwardly so that the face seal 28 projects axially away from the adjacent rotor end face 21 into sealing engagement with the adjacent side housing 12 of the internal cavity 14. Each face seal 28 is in sealing engagement with the end seal 27 adjacent each end thereof.

Although not shown in FIG. 1, the rotor 20 is journaled on an eccentric portion of a shaft and includes a phasing gear co-axial with the rotor axis, which is meshed with a fixed stator phasing gear secured to the outer body co-axially with the shaft. The rotor 20 rotates the shaft and the meshed gears guide the rotor 20 to perform orbital revolutions within the internal cavity 14. The shaft performs three rotations for each orbital revolution of the rotor 20 in the internal cavity 14. Oil seals are provided around the phasing gear to prevent leakage flow of lubricating oil radially outwardly thereof between the respective rotor end face 21 and outer body side housing 12.

At least one inlet port (not shown in FIG. 1) is defined through one of the side housings 12 or the rotor housing 13 for admitting air (atmospheric or compressed via a compressor) into one of the working chambers 24, and at least one exhaust port (not shown in FIG. 1) is defined through one of the side housings 12 or the rotor housing 13 for discharge of the exhaust gases from the working chambers 24. The inlet and exhaust ports are positioned relative to each other and relative to the ignitor and fuel injectors (further described below) such that during each revolution of the rotor 20, each chamber 24 moves around the internal cavity 14 with a variable volume to undergo the four phases of intake, compression, expansion and exhaust, these phases being similar to the strokes in a reciprocating-type internal combustion engine having a four-stroke cycle.

In a particular embodiment, these ports are arranged such that the rotary engine 10 operates under the principle of the Miller or Atkinson cycle, with its volumetric compression ratio lower than its volumetric expansion ratio. In another embodiment, the ports are arranged such that the volumetric compression and expansion ratios are equal or similar to one another.

Still referring to FIG. 1, a pilot cavity is defined in the outer body 11, for pilot fuel injection and ignition. In the embodiment shown example, the pilot cavity is in the form of a pilot subchamber 30, provided in an insert 31 received in a corresponding insert opening defined through the rotor housing 13 of the outer body 11 and in communication with the internal cavity 14, for pilot fuel injection and ignition. The pilot subchamber 30 is thus located radially outwardly of the inner surface 15 of the rotor housing 13. In a particular embodiment, the insert 31 is made of a material having a greater heat resistance than that of the rotor housing 13, which may be made for example of aluminium. For example, the insert 31 may be made of an appropriate type of ceramic or of an appropriate type of super alloy such as a Nickel based super alloy. Other configurations are also possible, including configurations where the pilot cavity (e.g. pilot subchamber 30) is defined directly in the outer body 11, for example in the rotor housing 13.

The pilot subchamber 30 is in communication with the internal cavity 14. In the embodiment shown, the pilot subchamber 30 has a circular cross-section; alternate shapes are also possible. The pilot subchamber 30 communicates with the internal cavity 14 through at least one opening or outlet 32, and has a shape forming a reduced cross-section adjacent the opening outlet 32, such that the outlet 32 defines a restriction to the flow between the pilot subchamber 30 and the internal cavity 14. The outlet 32 may have various shapes and/or be defined by multiple holes.

The insert 31 and/or rotor housing 13 have an ignitor elongated hole 33 defined therein, also in communication with the pilot subchamber 30. An ignitor 34 or ignition element is received and retained within the corresponding hole, with the tip of the ignitor 34 communicating with the pilot subchamber 30, for example by having the ignitor 34 extending outside of the pilot subchamber 30 and the ignitor elongated hole communicating with the pilot subchamber 30 through an opening or passage 35 aligned with the ignitor tip. In the embodiment shown, the ignitor 34 is a glow plug. Alternate types of ignitors 34 which may be used include, but are not limited to, plasma ignition, laser ignition, spark plug, microwave, etc.

A volume of the pilot subchamber 30 may range from 0.5% to 3.5% of a total engine volume as described in U.S. Pat. No. 11,215,110, the entire contends of which are incorporated herein by reference.

The rotor housing 13 has a pilot injector elongated hole 36 defined therethrough in proximity of the pilot subchamber 30, and in communication with the pilot subchamber 30. A pilot fuel injector, referred to below as a pilot injector 40, is received and retained within the corresponding hole 36, with the tip 41 of the pilot injector 40 in communication with the pilot subchamber 30.

The rotor housing 13 also has a main injector elongated hole 37 defined therethrough, in communication with the internal cavity 14 and spaced apart from the pilot cavity and pilot injector 40. A main fuel injector, referred to below as a main injector 50, is received and retained within this corresponding hole 37, with the tip 51 of the main injector 50 communicating with the internal cavity 14 at a point spaced apart from the communication between the outlet 32 of the pilot subchamber 30 and internal cavity 14. The main injector 50 is located rearward of the outlet 32 with respect to the direction R of the rotor rotation and revolution, i.e. upstream from the outlet 32 between the pilot subchamber 30 and working chambers 24, and is angled to direct fuel forwardly into each of the rotating chambers 24 sequentially with a tip hole configuration designed for an adequate spray.

The pilot injector 40 and main injector 50 inject fuel, which in a particular embodiment is heavy fuel e.g. diesel, kerosene (jet fuel), equivalent biofuel, etc. into the chambers 24. Alternatively, the fuel may be any other adequate type of fuel suitable for injection as described, including non-heavy fuel such as for example gasoline or liquid hydrogen fuel. In a particular embodiment, the pilot injector 40 and main injector 50 deliver the same type of fuel, for example from a common fuel source; alternately, the pilot injector 40 and main injector 50 may deliver different type of fuel.

The pilot subchamber 30 may help create a stable and powerful ignition zone to ignite the overall lean working chamber 24 to create the stratified charge combustion. The pilot subchamber 30 may improve combustion stability, particularly but not exclusively for a rotary engine which operates with heavy fuel below the self-ignition of fuel. The insert 31 made of a heat resistant material may advantageously create a hot wall around the pilot subchamber 30 which may further help with ignition stability.

In a particular embodiment, the rotary engine 10 is operated in accordance with the following. A pilot quantity of fuel is delivered into the pilot subchamber 30 and ignited within the pilot subchamber 30, and a main quantity of fuel is delivered into the working chambers 24 downstream of their communication with the pilot subchamber 30. When the rotary engine 10 operates at maximum load, both the pilot quantity and the main quantity may correspond to a maximum pilot and main injection fuel flow, respectively. However, when the rotary engine 10 operates at part load, some of the pilot and/or main injections are reduced or skipped, so as to reduce the fuel consumption, noise and/or vibrations on the rotary engine 10. Accordingly, one or both of the pilot and main quantity is varied between successive rotations of the shaft, i.e. between successive working chambers 24 (since the shaft performs three rotations for each complete revolution of the rotor 20, each shaft rotation corresponds to fuel injection in one of the working chambers 24). For example, the pilot and/or main injection quantity may be zero (skipped injection) for at least one of the successive rotations of the shaft, and greater than zero (e.g., maximum value) for at least another one of the successive rotations of the shaft.

Various injection patterns may be used to vary the quantity of fuel injected by the pilot and/or main injector(s) 40, 50 between the successive rotations of the shaft. In a particular embodiment, the injection pattern is repeated for each set of first, second and third successive rotations of the shaft, and accordingly each of the three working chambers 24 has its particular injection conditions. For example, for the first shaft rotation (first working chamber 24), the main quantity is zero and the pilot quantity is greater than zero, i.e. the main injection is skipped while a pilot injection is performed; for the second rotation (second working chamber 24), the main and pilot quantities are both zero, i.e. both the main and pilot injections are skipped; and for the third rotation (third working chamber 24), the main and pilot quantities are both greater than zero, i.e. a pilot and main injections are both performed.

In the present embodiment, a distance between the tip of fuel injector 50 and the pilot subchamber 30 is less than a distance between two adjacent apexes 23 of the rotor 20. This may ensure that both of the tip of the main injector 50 and the outlet 32 of the pilot subchamber 30 are simultaneously in fluid flow communication with a common one of the combustion chambers 24. More specifically, the fuel injected in the pilot subchamber 30 may be used to ignite the fuel injected into the combustion chamber 24. Thus, upon ignition of the fuel in the pilot subchamber 30, the ignited fuel flows out of the pilot subchamber 30 via the outlet 32 to reach the combustion chamber 24 thereby igniting the fuel received therein. This configuration may allow the use of two different types of fuel each having their respective advantages.

Still referring to FIG. 1, the pilot injector 40 and the main injector 50 may both be fluidly connected to a main fuel source S1 and an alternative fuel source S2 and may both be operable to inject a selected one of a main fuel from the main fuel source S1 and an alternative fuel from the alternative fuel source S2. The pilot injector 40 and the main injector 50 are operatively connected to a controller 70 operable to determine which of the main fuel and the alternative fuel to use. More detail about this are presented below. The pilot injector 40 and the main injector 50 may be each be fluidly connected to both of the main fuel source S1 and the alternative fuel source S2. The pilot injector 40 has a first configuration in which the pilot injector 40 fluidly connects the main fuel source S1 to the pilot subchamber 30 while fluidly disconnecting the alternative fuel source S2 from the pilot subchamber 30. The pilot injector 40 has a second configuration in which the pilot injector 40 fluidly connects the alternative fuel source S2 to the pilot subchamber 30 while fluidly disconnecting the main fuel source S1 from the pilot subchamber 30. The main injector 50 has a first configuration in which the main injector 50 fluidly connects the main fuel source S1 to the combustion chamber 24 while fluidly disconnecting the alternative fuel source S2 from the combustion chamber 24. The main injector 50 has a second configuration in which the main injector 50 fluidly connects the alternative fuel source S2 to the combustion chamber 24 while fluidly disconnecting the main fuel source S1 from the combustion chamber 24. As aforementioned, outlet(s) defined by a tip of the pilot injector 40 is(are) in fluid communication with the combustion chamber 24 through the pilot subchamber 30, and outlet(s) defined by a tip of the main injector 50 is(are) in fluid communication with the combustion chamber 24 independently of the pilot subchamber 30. In other words, the main injector 50 injects fuel into the combustion chamber 24 while bypassing the pilot subchamber 30.

In some embodiments, the injectors 40, 50 each have two inlets and two outlets for injecting two different fuels. Such an exemplary injector is described below with reference to FIG. 4. Alternatively, the injectors 40, 50 may have a single outlet and two distinct inlets. The injector may thus be operable to selectively fluidly connect either one of the two distinct inlets to the single outlet. In other words, in some engine configurations, the injector may not need to distinct outlets.

Figure 2:
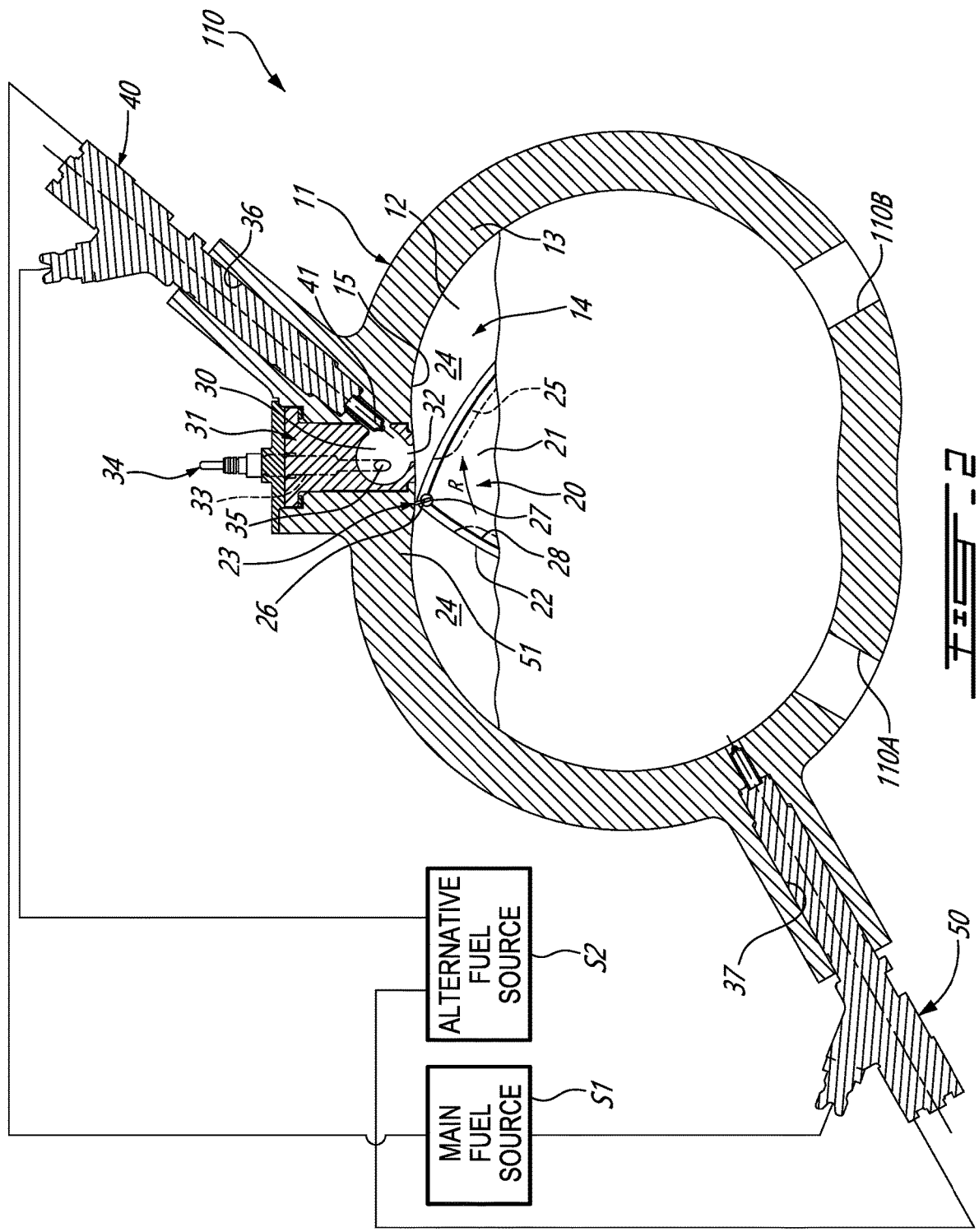
FIG. 2 is a partial cross-sectional view of a rotary engine in accordance with another embodiment.

Referring now to FIG. 2, a rotary engine in accordance with another embodiment is shown at 110. For the sake of conciseness, only features differing from the rotary engine 10 described above with reference to FIG. 1 are described below.

In the embodiment shown, the main injector 50 of the rotary engine 110 is spaced further away from the outlet 32 of the pilot subchamber 30. The outer body 11 of the rotary engine 110 defines an intake 110A and an exhaust 110B. The intake 110A is located downstream of the exhaust 110B relative to the direction of rotation R of the rotor 20. The intake 110A is in fluid communication with an air source, such as ambient air, or a compressor, for injecting air into the combustion chamber 24. The exhaust 110B is used for expelling combustion gases out of the combustion chamber 24. In some embodiments, the exhaust 110B is fluidly connected to a turbine that extract energy from the combustion gases. The turbine may drive a shaft that may be drivingly engaged to the shaft of the rotary engine 110 to compound power therewith.

A distance, about a circumference of the rotor housing 13, between the outlet 32 of the pilot subchamber 30 and the tip of the main injector 50 may be greater than a distance between adjacent apexes of the rotor 20. Put differently, the main injector 50 may be located closer to the intake 110A than the pilot subchamber 30. This may allow the injection of fuel into the combustion chamber 24 before a volume of the combustion chamber 24 starts to decrease for compressing the air. This may allow a better mixing of the fuel with the air before ignition. This may change the combustion mode from a diffusion type flame to a premixed flame. In other words, the rotary engine 110 may use an indirect injection rather than a direction injection as for the rotary engine 10 of FIG. 1. This configuration may allow more time for mixing the fuel with an oxidizer (e.g., oxygen). In an indirect injection, the fuel is mixed with air prior to being injected in to the combustion chamber. Therefore, a mixture of air and fuel is injected in the combustion chamber via the intake 110A (FIG. 2). Hence, the main injector 50 may have its tip in fluid communication with a conduit that has an outlet fluidly connected to the intake 110A.

Figure 3:
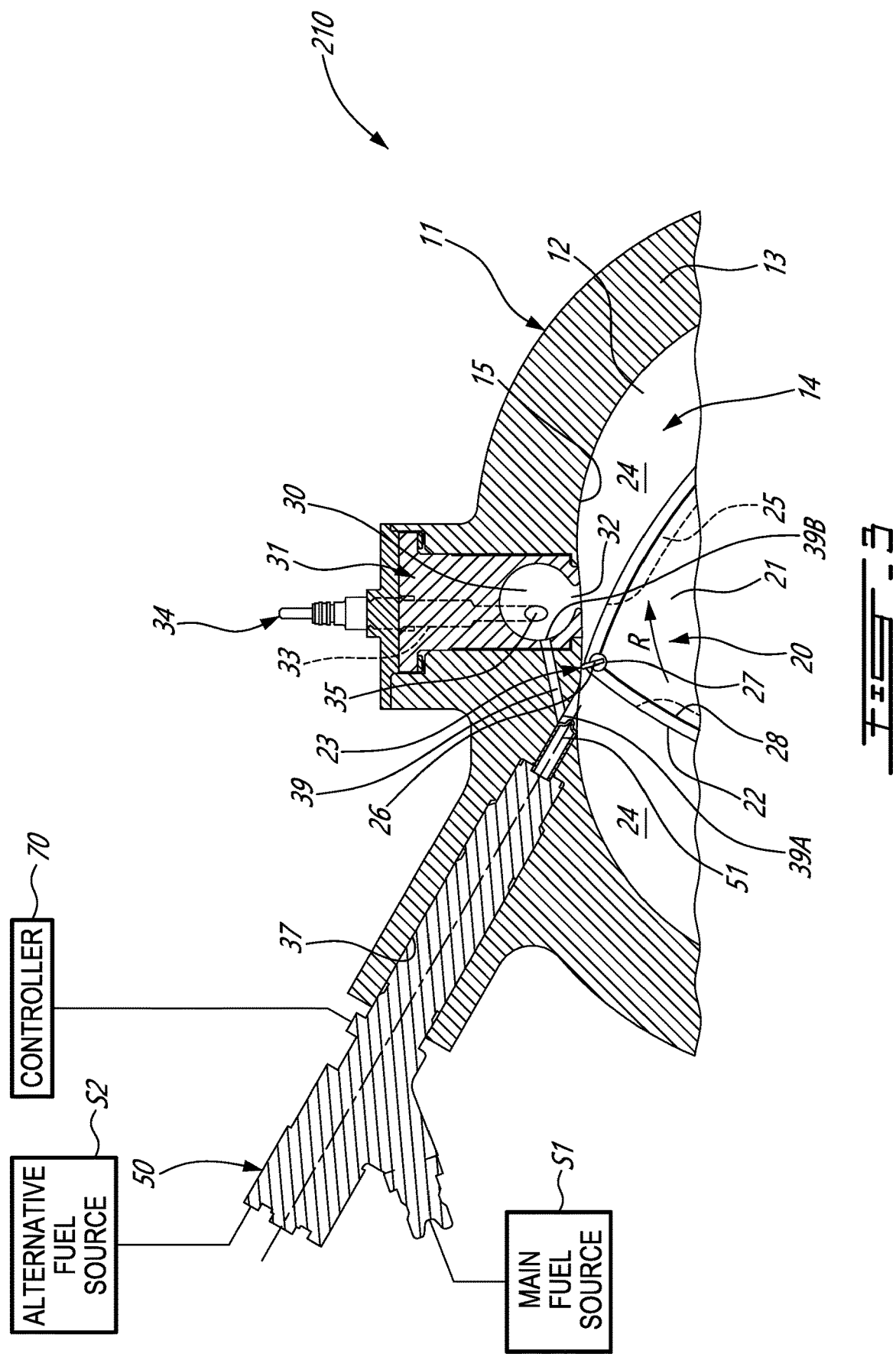
FIG. 3 is a partial cross-sectional view of a rotary engine in accordance with yet another embodiment.

Referring now to FIG. 3, a rotary engine in accordance with another embodiment is shown at 210. For the sake of conciseness, only features differing from the rotary engine 10 of FIG. 1 are described below.

In the embodiment shown, the main injector 50 is a single injector. The rotary engine 210 is thus devoid of the pilot injector 40. In other words, the fuel received into the pilot subchamber 30 is provided by the main injector 50. The main injector 50 is fluidly connected to both of the main fuel source S1 and the alternative fuel source S2.

The outer body 11 of the rotary engine 110 defines a passage 39 therein. The passage 39 is located radially outwardly of the inner surface 15 of the rotor housing 13. The passage 39 may be sub-divided into a plurality of sub-passages. The passage 39 fluidly connects the main injector elongated hole 37 to the pilot subchamber 30. The passage 39 has a passage inlet 39A in fluid flow communication with one of outlets of the main injector 50 and a passage outlet 39B in fluid communication with the pilot subchamber 30. The passage outlet 39B opens to the pilot subchamber 30. As shown in FIG. 2, the passage outlet 39B opens to the pilot subchamber 30 at a location spaced apart from the outlet 32 of the pilot subchamber 30 via which the fuel injected in the pilot subchamber 30 reaches the combustion chambers 24. In other words, the passage 39 is separated from the internal cavity 14 of the rotary engine 110. By being "separated", it is implied that the passage 39 is free of intersection with the internal cavity 14 or combustion chamber 24 of the rotary engine 110. The passage 39 therefore provides a fluid communication from the one of the outlets of the main injector 50 to the pilot subchamber 30 without passing by the internal cavity 14.

Figure 4:
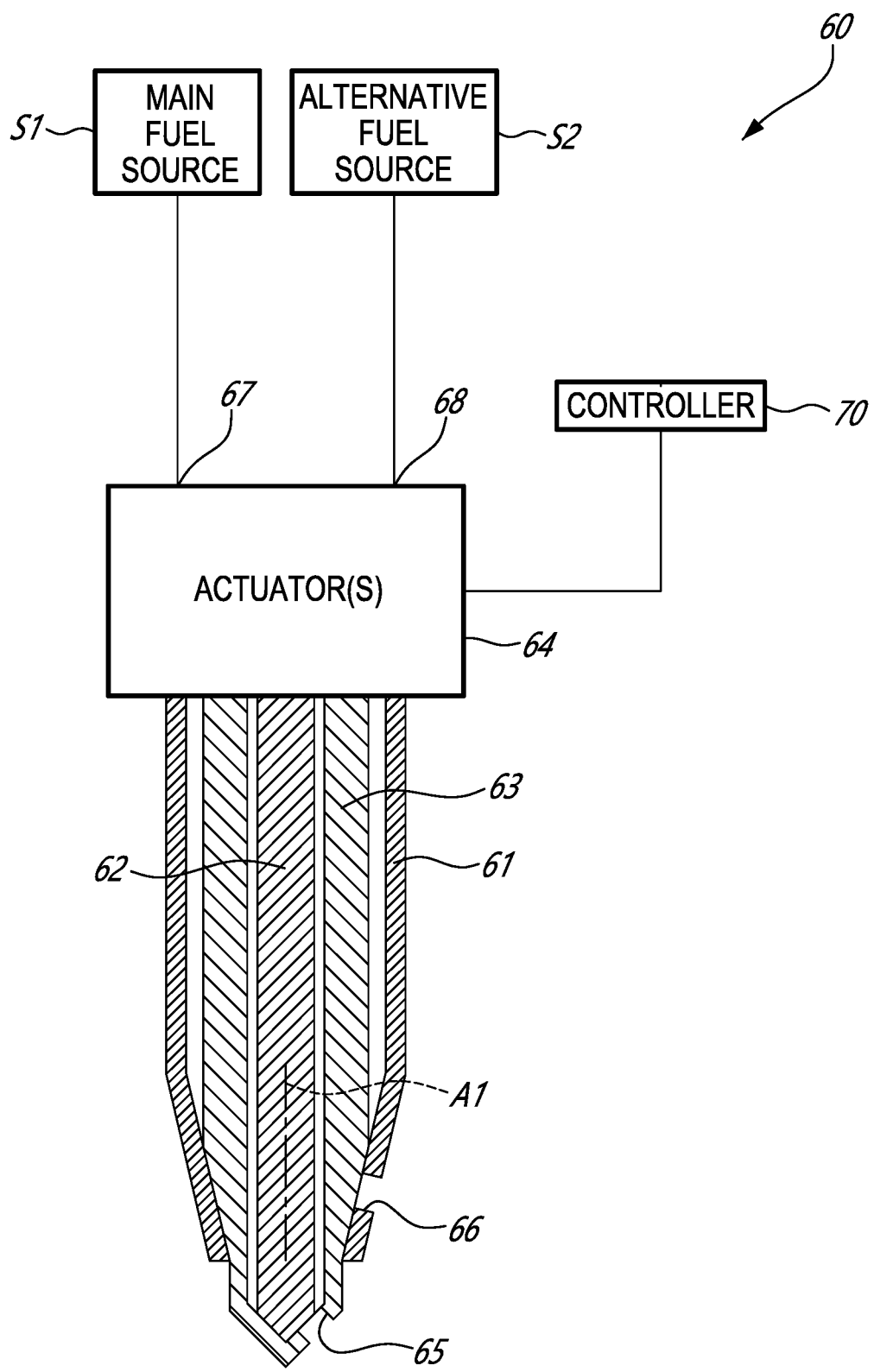
FIG. 4 is a cross-sectional view of a fuel injector in accordance with one embodiment to be used with the rotary engines of FIGS. 1-3.

Referring now to FIG. 4, an injector 60, which may correspond to any of the pilot injector 40 or the main injector 50 of FIGS. 1-3, is shown. Both of the pilot and main injectors may be a dual-needle injector as shown in FIG. 4. The injector 60 is referred to as a dual-needle injector. The injector 60 has a main body 61 enclosing a needle assembly comprising an inner needle 62 and an outer needle 63. The outer needle 63 is hollow and the inner needle 62 is received within the outer needle 63. One or more actuator(s) 64 are engaged to the inner needle 62 and the outer needle 63 to control their axial motion relative to a central axis A1 and relative to the main body 61. The one or more actuator(s) 64 may be electronically controlled and operatively connected to a controller 70. The one or more actuator(s) 64 may be solenoid, fuel-draulic actuators, hydraulic actuators, pneumatic actuators and so on. The injector 60 has a tip defined by the outer needle 63. The outer needle 63 defines a first outlet 65 of the injector 60 whereas the main body 61 defines a second outlet 66 of the injector 60. The first outlet 65 and the second outlet 66 are spaced apart from one another and may output fuel at different directions. In the present embodiment, the second outlet 66 injects fuel in a direction having a radial component relative to the central axis A1 if the injector 60. The first outlet 65 is defined by one or more aperture(s) and the second outlet 66 is defined by one or more aperture(s). It will be appreciated that any injector able to inject two different fuels via two different outlets may be used without departing from the scope of the present disclosure.

The first outlet 65 and the second outlet 66 are separated and distinct from one another. Put differently, fuel may be injected via the first outlet 65 while the second outlet 66 remains closed. Similarly, fuel may be injected via the second outlet 66 while the first outlet 65 remains closed. In some cases, fuel may be injected simultaneously by both of the first outlet 65 and the second outlet 66. The fuel(s) flow through the injector 60 along respective flow paths that remain independent until they are outputted via the first outlet 65 and the second outlet 66. Herein, the expression "independent" implies that the fuels are not mixed within the injector 60. The fuels remain isolated and separated from one another.

The fuel injector 60 has a first inlet 67 fluidly connected to the first outlet 65 and a second inlet 68 fluidly connected to the second outlet 66. The injector 60 may have a first configuration in which the first inlet 67 is fluidly connected to the first outlet 65 while the second inlet 68 is fluidly disconnected from the second outlet 66; a second configuration in which the first inlet 67 is fluidly disconnected from the first outlet 65 and in which the second inlet 68 is fluidly connected to the second outlet 66, a third configuration in which the first inlet 67 is fluidly connected to the first outlet 65 and in which the second inlet 68 is fluidly connected to the second outlet 66, and a fourth configuration in which both of the first inlet 67 and the second inlet 68 are fluidly disconnected from their respective first outlet 65 and the second outlet 66.

Referring to FIGS. 3-4, in the embodiment shown, the first outlet 65 may be aligned with a port defined through the outer body 11 (e.g., rotor housing 13) for injecting fuel directly into the combustion chambers 24 while bypassing the pilot subchamber 30. The second outlet 66 may be aligned with the passage 39 defined by the outer body 11. The rotary engine 210 therefore defines two parallel flow paths from the injector 60 to the internal cavity 14. A first flow path extends from the first outlet 65 of the injector 60 directly to the internal cavity 14 while bypassing the pilot subchamber 30. A second flow path extends from the second outlet 66 of the injector 60 to the internal cavity 14 through the pilot subchamber 30.

Typically, heavy fuels are used. However, environmental concerns may require a reduction of these heavy fuels. The rotary engine 210 of the present disclosure may therefore use an alternative "greener" fuel, such as gasoline, hydrogen, liquefied natural gas, ammonia, sustainable fuel for aviation (SAF), and so on in conjunction with a heavy fuel, such as diesel, jet fuel, and so on. The SAF may include fuels derived from food waste (e.g., non-fossil fuels). In other words, the fuel injector 50 receives a main fuel from the main fuel source S1 and an alternative fuel from the alternative fuel source S2. The alternative fuel may be injected directly into the combustion chamber 24 via the first outlet 65 while bypassing the pilot subchamber 30 and the main fuel may be injected into the pilot subchamber 30 via the first outlet 65. Although the alternatives fuels may be less polluting, they are less suited for auto-ignition. Herein, the expression "auto-ignition" means that a fuel is able to self-ignite, by one or more of temperature and pressure, without requiring an external input of energy, such as via an igniter. The heavy fuels are typically able to auto-ignite. Consequently, the main fuel may have a first energy requirement to ignite that is less than a second energy requirement to ignite of the alternative fuel. The main fuel may have a first cetane number greater than a second cetane number of the alternative fuel. The alternative fuel may be gasoline, hydrogen, liquefied natural gas, ammonia and so on while the main fuel may be a heavy fuel, such as diesel, jet fuel, and so on.

Still referring to FIG. 3, the controller 70 is operable to cause the injector 50 to inject the alternative fuel in the at least one chamber 24 via one of the outlets of the injector 50; and to ignite the alternative fuel received in the at least one chamber 24 by injecting the main fuel into the pilot subchamber 30 via the other of the outlets of the injector 50. In the present embodiment, the controller 70 causes the injection of the main fuel into the pilot subchamber 30 before a volume of the at least one chamber 24 reaches a minimum volume. This is such that the main fuel is subjected to a compressive force as the rotor 20 rotates to decrease the volume of the combustion chamber 24, which in this case encompasses the volume of the pilot subchamber 30, to the minimal volume to cause auto-ignition of the main fuel. The ignited main fuel will then exit the pilot subchamber 30 via the outlet 32 of the pilot subchamber 30 to reach the combustion chamber 24 thereby igniting the alternative fuel received therein. Ignition of the alternative fuel may thus rely on the auto-ignition of the main fuel. In some cases, an igniter may be provided to ignite the main fuel. The engines 10, 110, 210 may be devoid of an igniter having a tip directly exposed to the rotor cavity 14 independently of the pilot subchamber 30.

Referring to FIGS. 1-3, the controller 70 is operatively connected to the injector(s) to inject a selected one of the main fuel from the main fuel source S1 and the alternative fuel from the alternative fuel source S2. The controller 70 is therefore configured to determine that the rotary engine 10, 110, 210 is in a vicinity of a city or an airport; and upon determining that rotary engine is in the vicinity of the city or the airport, operate the main injector 50 in a first configuration in which the main injector 50 fluidly connects the alternative fuel source S2 to the rotor cavity while disconnecting the main fuel source S1 from the rotor cavity. In this embodiment, the main fuel of the main fuel source S1 is a heavy fuel, such as diesel or jet fuel and the alternative fuel of the alternative fuel source S2 may be a more environmentally friendly fuel such as, for instance, gasoline, ammonia, liquefied natural gas, and so on. Therefore, the controller 70 may determine that the rotary engine 10, 110, 210, or an aircraft equipped with said engine, is proximate a city or an airport and that pollution is to be reduced proximate these locations.

Herein, the expression "vicinity" implies that one or more of a ground distance between the aircraft or rotary engine is below from about 50 to about 100 kilometers and an altitude of the aircraft is below about 5000 feet. Herein, the expression "about" implies variations of plus or minus 10%.

The controller 70 may further determine that the rotary engine 10, 110, 210 is outside the vicinity of a city or an airport; and upon determining that rotary engine is outside the vicinity of the city or the airport, operate the main injector 50 in a second configuration in which the main injector 50 fluidly connects the main fuel source S1 to the rotor cavity while disconnecting the alternative fuel source S2 from the rotor cavity. Thus, when the rotary engine or aircraft is further away from these locations, the heavy fuel, which may be less environmentally friendly, but which may provide a more efficient combustion, may be used instead.

In the embodiments of FIGS. 1 and 2, the pilot injector 40 may also be used to inject a selected one of the main fuel and the alternative fuel. The controller 70 may determine that a temperature of the rotary engine; operate the pilot injector in a first configuration in which the pilot injector 40 fluidly connects the main fuel source S1 to the pilot subchamber 30 while disconnecting the alternative fuel source S2 from the pilot subchamber 30 when the temperature is below a temperature threshold; and operate the pilot injector 40 in a second configuration in which the pilot injector 40 fluidly connects the alternative fuel source S2 to the pilot subchamber 30 while disconnecting the main fuel source S1 from the pilot subchamber 30 when the temperature is above the temperature threshold.

In fact, when the rotary engine is cold, that is, when its temperature is below the temperature threshold, conditions in the pilot subchamber 30 may be less suitable for ignition. In such cases, the heavy fuel, which is more suitable for auto-ignition, may be used. Once the rotary engine has warmed up and its temperature is above the temperature threshold, the second or alternative fuel may be used instead.

The controller 70 may determine that the rotary engine or aircraft is proximate the city or airport by determining that an altitude of the rotary engine or aircraft is below an altitude threshold, by determining that GPS coordinates of the rotary engine that indicate that a distance between the rotary engine or aircraft and the city or the airport is below a distance threshold, and/or by determining that a flight phase of the rotary engine corresponds to taxi, takeoff, climb, approach, or landing. Sensors, such as a temperature sensor, a pressure sensor, a speed sensor may be used to determine the flight phase. For instance, if the ambient temperature is below an ambient temperature threshold, this may imply that the aircraft is flying at a high altitude. The pressure sensor may determine the ambient pressure. If this ambient pressure is below an ambient pressure sensor, this may imply that the aircraft is flying at a high altitude. The speed sensor may determine a travel speed of the aircraft. If this travel speed is above a speed threshold, this may imply that the aircraft is flying at a high altitude during a cruise phase.

Figure 5:
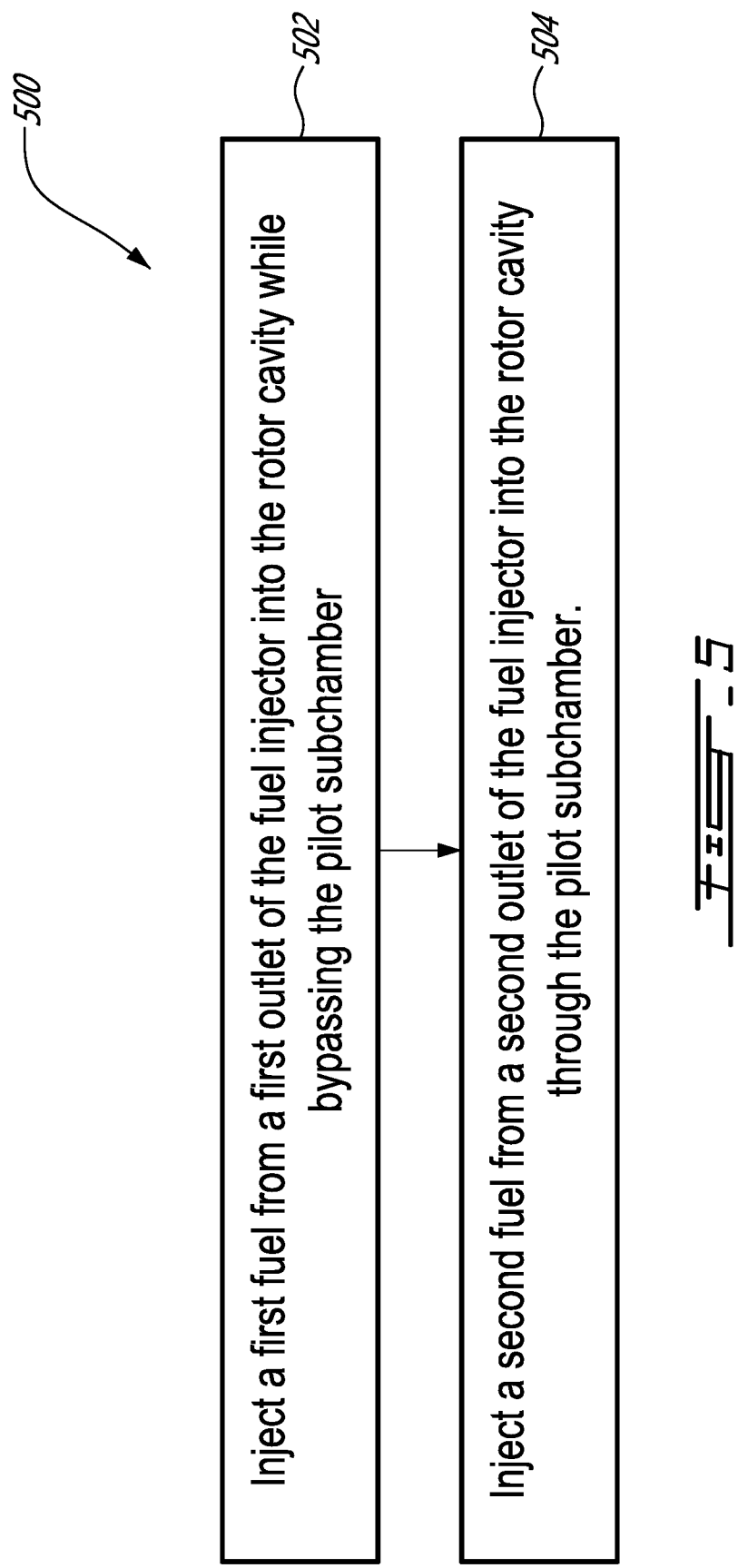
FIG. 5 is a flow chart illustrating steps of a method of supplying fuel to the rotary engine of FIG. 3.

Referring now to FIG. 5, a method of supplying fuel to the rotary engine 210 of FIG. 3 is shown at 500. The method 500 includes injecting a first fuel from a first outlet of the fuel injector 50 into the rotor cavity 14 while bypassing the pilot subchamber 30 at 502; and injecting a second fuel from a second outlet of the fuel injector 50 into the rotor cavity 14 through the pilot subchamber 30. In the embodiment shown, the injecting of the second fuel at 504 includes injecting the second fuel into the pilot subchamber 30 via the passage 39 defined by the outer body 11. The injecting of the first fuel at 502 may include injecting the first fuel into two or more injection sequences. For instance, a first portion of the first fuel may be injected at a first position of the rotor. Then, no first fuel is injected as the rotor moves from the first position to a second position. A second portion of the first fuel may be injected while the rotor moves away from the second position. These injection sequences may be used to inject the fuel into the same combustion chamber at distinct intervals to create a stratification of the mixture of air and fuel in said combustion chamber. The same may apply to the injecting of the second fuel at 504.

The injecting of the first fuel at 502 and the injecting of the second fuel at 504 includes injecting the second fuel being different from the first fuel. The injecting of the first fuel and the injecting of the second fuel may include injecting the first fuel having a first energy requirement to ignite being greater than a second energy requirement of the second fuel. The injecting of the first fuel and the injecting of the second fuel may include injecting the first fuel having a first cetane number being less than a second cetane number of the second fuel. The injecting of the first fuel and the injecting of the second fuel may include injecting gasoline as the first fuel and injecting a heavy fuel as the second fuel. The injecting of the first fuel and the injecting of the second fuel includes injecting hydrogen as the first fuel and injecting a heavy fuel as the second fuel.

In the embodiment illustrated, the injecting of the second fuel from the second outlet of the fuel injector 50 at 504 includes injecting the second fuel before a volume of at least one chamber 24 reaches a minimum volume, and auto-igniting the second fuel by compressing the second fuel with the rotor 20.

Figure 6:
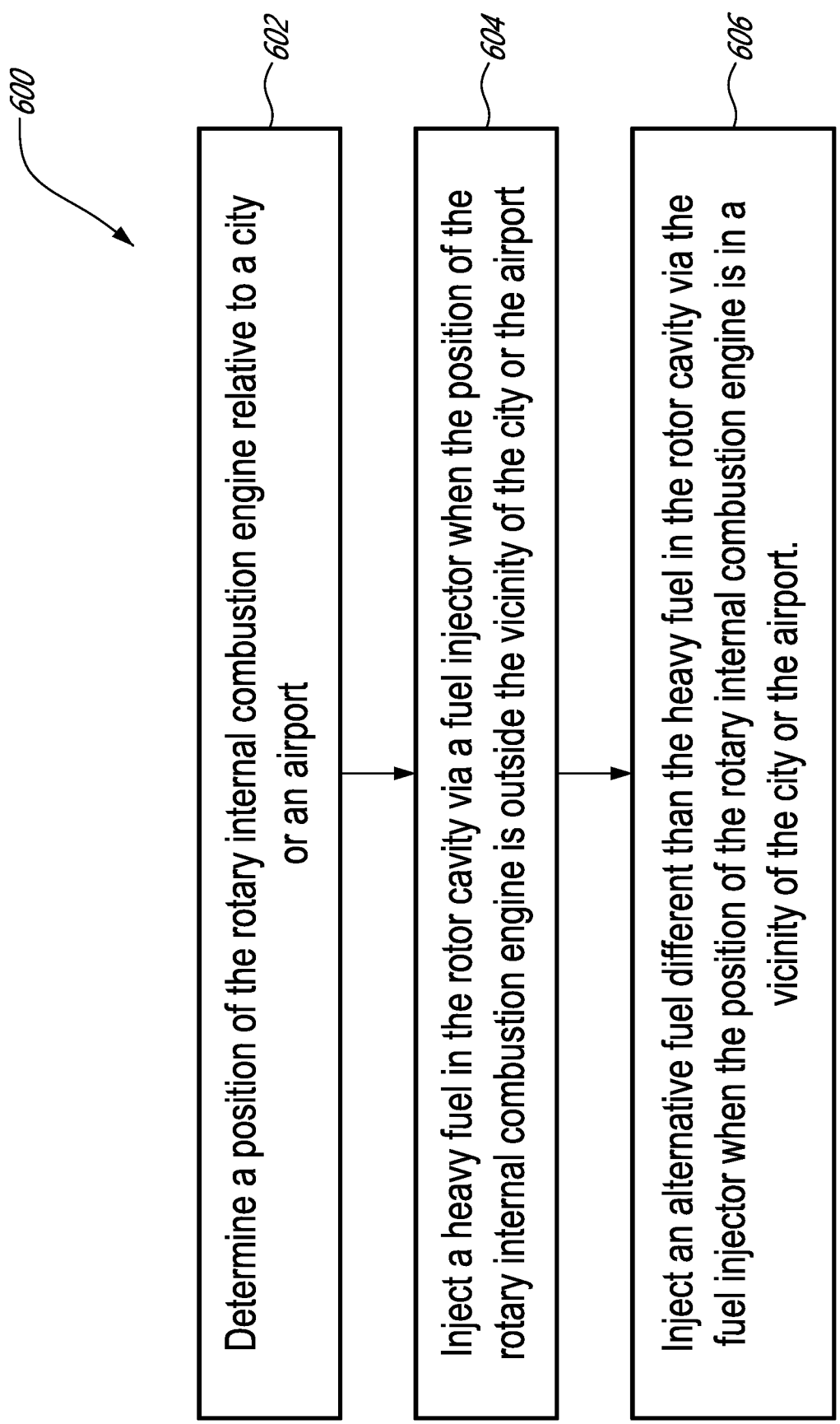
FIG. 6 is a flow chart illustrating steps of a method of supplying fuel to the rotary engines of FIGS. 1-3.

Referring now to FIG. 6, a method of supplying fuel to the rotary engines 10, 110, 210 of FIGS. 1-3 is shown at 600. The method 600 includes determining a position of the rotary engine 10, 110, 210 relative to a city or an airport at 602; injecting a heavy fuel in the rotor cavity 14 via a fuel injector when the position of the rotary engine is outside a vicinity of the city or the airport at 604; and injecting an alternative fuel different than the heavy fuel in the rotor cavity via the fuel injector when the position of the rotary engine is in the vicinity of the city or the airport at 606.

The method 600 may include determining a temperature of the rotary engine; and injecting the heavy fuel in the pilot subchamber 30 via the pilot injector 40 when the temperature is below a temperature threshold. The method may further include injecting the alternative fuel in the pilot subchamber 30 via the pilot injector 40 when the temperature is above the temperature threshold.

In the embodiment shown, the determining of the position of the rotary engine includes determining one or more of an altitude of the rotary engine being below an altitude threshold, GPS coordinates of the rotary engine indicative that a distance between the rotary engine and the city or the airport is below a distance threshold, and a flight phase of the rotary engine corresponding to taxi, takeoff, climb, approach, or landing.

As mentioned above, a first energy requirement to ignite the alterative fuel may be greater than a second energy requirement to ignite the main fuel. The alternative fuel may have a first cetane number being less than a second cetane number of the main fuel. The alternative fuel may gasoline, hydrogen, liquefied natural gas, ammonia, and the heavy fuel may be diesel or jet fuel.

In the embodiment of FIG. 3, the method includes injecting the alternative fuel or the main fuel in the pilot sub-chamber 30 with the pilot fuel injector 40 via the passage 39 defined by the outer body 11.

With reference to FIG. 7, an example of a computing device 700 is illustrated. For simplicity only one computing device 700 is shown but the system may include more computing devices 700 operable to exchange data. The computing devices 700 may be the same or different types of devices. The controller 70 may be implemented with one or more computing devices 700. Note that the controller 70 can be implemented as part of a full-authority digital engine controls (FADEC) or other similar device, including electronic engine control (EEC), engine control unit (ECU), electronic propeller control, propeller control unit, and the like. In some embodiments, the controller 70 is implemented as a Flight Data Acquisition Storage and Transmission system, such as a FAST™ system. The controller 70 may be implemented in part in the FAST™ system and in part in the EEC. Other embodiments may also apply.

The computing device 700 comprises a processing unit 702 and a memory 704 which has stored therein computer-executable instructions 706. The processing unit 702 may comprise any suitable devices configured to implement the method described herein such that instructions 706, when executed by the computing device 700 or other programmable apparatus, may cause the functions/acts/steps performed as part of the methods as described herein to be executed. The processing unit 702 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 704 may comprise any suitable known or other machine-readable storage medium. The memory 704 may comprise non-transitory computer readable storage medium, for example, but not limited to, an electronic, magnetic, optical, electromagnetic, infrared, or semiconductor system, apparatus, or device, or any suitable combination of the foregoing. The memory 704 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 704 may comprise any storage means (e.g., devices) suitable for retrievably storing machine-readable instructions 706 executable by processing unit 702.

The methods and systems for supplying fuel described herein may be implemented in a high level procedural or object oriented programming or scripting language, or a combination thereof, to communicate with or assist in the operation of a computer system, for example the computing device 700. Alternatively, the methods and systems for supplying fuel may be implemented in assembly or machine language. The language may be a compiled or interpreted language. Program code for implementing the methods and systems for supplying fuel may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for supplying fuel may also be considered to be implemented by way of a non-transitory computer-readable storage medium having a computer program stored thereon. The computer program may comprise computer-readable instructions which cause a computer, or more specifically the processing unit 702 of the computing device 700, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A rotary engine, comprising:
an outer body defining a rotor cavity;
a rotor rotatable within the rotor cavity and in sealing engagement with walls of the outer body and defining at least one chamber of variable volume in the rotor cavity;
a pilot subchamber defined by the outer body, the pilot subchamber having an outlet in fluid flow communication with the rotor cavity;
a main fuel source of a heavy fuel;
an alternative fuel source of an alternative fuel different from the heavy fuel;
a main injector having a tip in fluid communication with the rotor cavity at a location spaced apart from the outlet of the pilot subchamber, the main injector selectively fluidly connectable to the main fuel source or to the alternative fuel source; and
a controller having a processing unit and a computer-readable medium having instructions stored thereon executable by the processing unit to cause the processing unit to:
determine that the rotary engine is in a vicinity of a city or an airport; and
upon determining that rotary engine is in the vicinity of the city or the airport, operate the main injector in a first configuration in which the main injector fluidly connects the alternative fuel source to the rotor cavity while disconnecting the main fuel source from the rotor cavity.

2. The rotary engine of claim 1, wherein the instructions further cause the processing unit to:
determine that the rotary engine is outside the vicinity of a city or an airport; and
upon determining that rotary engine is outside the vicinity of the city or the airport, operate the main injector in a second configuration in which the main injector fluidly connects the main fuel source to the rotor cavity while disconnecting the alternative fuel source from the rotor cavity.

3. The rotary engine of claim 1, wherein the instructions cause the processing unit to determine that the rotary engine is in the vicinity of the city or the airport by
determining one or more of an altitude of the rotary engine being below an altitude threshold, GPS coordinates of the rotary engine indicative that a distance between the rotary engine and the city or the airport is below a distance threshold, and a flight phase of the rotary engine corresponding to taxi, takeoff, climb, approach, or landing.

4. The rotary engine of claim 1, wherein a first energy requirement to ignite the alterative fuel is greater than a second energy requirement to ignite the main fuel.

5. The rotary engine of claim 1, wherein the alternative fuel has a first cetane number being less than a second cetane number of the main fuel.

6. The rotary engine of claim 1, wherein the alternative fuel is gasoline, hydrogen, liquefied natural gas, or ammonia, and the heavy fuel is diesel or jet fuel.

7. The rotary engine of claim 1, wherein a distance between the tip of the main injector and the pilot subchamber is less than a distance between two adjacent apexes of the rotor.

8. The rotary engine of claim 1, further comprising a pilot injector having a tip in communication with the pilot subchamber, the pilot injector fluidly connectable to the main fuel source or the alternative fuel source.

9. The rotary engine of claim 8, wherein the instructions further cause the processing unit to:
determine a temperature of the rotary engine;
operate the pilot injector in a first configuration in which the pilot injector fluidly connects the main fuel source to the pilot subchamber while disconnecting the alternative fuel source from the pilot subchamber when the temperature is below a temperature threshold; and
operate the pilot injector in a second configuration in which the pilot injector fluidly connects the alternative fuel source to the pilot subchamber while disconnecting the main fuel source from the pilot subchamber when the temperature is above the temperature threshold.

10. The rotary engine of claim 1, wherein the tip of the main injector has a first outlet in fluid communication with the rotor cavity independently of the pilot subchamber, and a second outlet in fluid communication with the rotor cavity through the pilot subchamber.

11. The rotary engine of claim 10, wherein the main injector is the sole fuel injector of the rotary engine, being devoid of a pilot injector.

12. The rotary engine of claim 11, wherein the outer body defines at least one passage having a passage inlet in fluid flow communication with the second outlet of the main injector, and a passage outlet opening to the pilot subchamber.

13. A method of supplying fuel to a rotary engine having a pilot subchamber fluidly connected to a rotor cavity defined by an outer body and a fuel injector, comprising:
determining a position of the rotary engine relative to a city or an airport;
injecting a heavy fuel in the rotor cavity via the fuel injector when the position of the rotary engine is outside a vicinity of the city or the airport; and
injecting an alternative fuel different than the heavy fuel in the rotor cavity via the fuel injector when the position of the rotary engine is in the vicinity of the city or the airport.

14. The method of claim 13, wherein the determining of the position of the rotary engine includes determining one or more of an altitude of the rotary engine being below an altitude threshold, GPS coordinates of the rotary engine indicative that a distance between the rotary engine and the city or the airport is below a distance threshold, and a flight phase of the rotary engine corresponding to taxi, takeoff, climb, approach, or landing.

15. The method of claim 13, wherein a first energy requirement to ignite the alterative fuel is greater than a second energy requirement to ignite the main fuel.

16. The method of claim 13, wherein the alternative fuel has a first cetane number being less than a second cetane number of the main fuel.

17. The method of claim 13, wherein the alternative fuel is gasoline, hydrogen, liquefied natural gas, ammonia, and the heavy fuel is diesel.

18. The method of claim 13, comprising:
   determining a temperature of the rotary engine; and
   injecting the heavy fuel in the pilot subchamber via a pilot injector when the temperature is below a temperature threshold.

19. The method of claim 18, comprising injecting the alternative fuel in the pilot subchamber via the pilot injector when the temperature is above the temperature threshold.

20. A rotary engine, comprising:
   an outer body defining a rotor cavity;
   a rotor rotatable within the rotor cavity and in sealing engagement with walls of the outer body and defining at least one chamber of variable volume in the rotor cavity;
   a pilot subchamber defined by the outer body, the pilot subchamber having an outlet in fluid flow communication with the rotor cavity;
   a main fuel source of a heavy fuel;
   an alternative fuel source of an alternative fuel different from the heavy fuel;
   a main injector having a tip in fluid communication with the rotor cavity at a location spaced apart from the outlet of the pilot subchamber, the main injector having a first main inlet fluidly connected to the main fuel source, a second main inlet fluidly connected to the alternative fuel source, a first main outlet defined by the tip and fluidly connectable to the first main inlet, and a second main outlet defined by the tip and fluidly connected to the second main inlet, the main injector configured for injecting a selected one of the heavy fuel and the alternative fuel into the rotor cavity; and
   a pilot injector having a tip in fluid communication with the pilot subchamber, the pilot injector having a first pilot inlet fluidly connected to the main fuel source, a second pilot inlet fluidly connected to the alternative fuel source, a first pilot outlet defined by the tip and fluidly connectable to the first pilot inlet, and a second pilot outlet defined by the tip and fluidly connectable to the second pilot inlet, the pilot injector configured for injecting a selected one of the heavy fuel and the alternative fuel into the pilot subchamber.

* * * * *